United States Patent
Boehm et al.

(10) Patent No.: US 11,808,330 B2
(45) Date of Patent: Nov. 7, 2023

(54) ELECTROMECHANICAL BRAKE PRESSURE GENERATOR FOR A HYDRAULIC BRAKING SYSTEM OF A VEHICLE AND METHOD FOR MANUFACTURING AN ELECTROMECHANICAL BRAKE PRESSURE GENERATOR

(71) Applicant: Robert Bosch GmbH, Stuttgart (DE)

(72) Inventors: Mark Boehm, Lehrensteinsfeld (DE); Claus Oehler, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 119 days.

(21) Appl. No.: 16/852,864

(22) Filed: Apr. 20, 2020

(65) Prior Publication Data
US 2020/0340563 A1    Oct. 29, 2020

(30) Foreign Application Priority Data
Apr. 25, 2019   (DE) .......................... 102019205977.5

(51) Int. Cl.
*B60T 13/74*     (2006.01)
*F16H 25/24*    (2006.01)
(Continued)

(52) U.S. Cl.
CPC ............. *F16H 25/24* (2013.01); *B60T 7/042* (2013.01); *B60T 8/3255* (2013.01); *B60T 13/745* (2013.01); *F16H 2025/2445* (2013.01)

(58) Field of Classification Search
CPC ...... B60T 13/745; B60T 13/74; B60T 13/741; F16D 2125/40; F16D 2121/24;
(Continued)

(56) References Cited

U.S. PATENT DOCUMENTS 2,218,605 A  * 10/1940  Down ..................... B60T 13/74
                                                    188/173
5,302,008 A  *  4/1994  Miyake ................... B60T 13/66
                                                    303/14
(Continued)

FOREIGN PATENT DOCUMENTS

CN    106255152 A    12/2016
CN    107506648 A    12/2017
(Continued)

*Primary Examiner* — Nicholas J Lane
*Assistant Examiner* — Stephen M Bowes
(74) *Attorney, Agent, or Firm* — NORTON ROSE FULBRIGHT US LLP; Gerard Messina

(57) ABSTRACT

An electromechanical brake pressure generator including a threaded drive system. The system includes a rotatable spindle nut, a axially displaceable spindle cooperating with a thread of the spindle nut, and a hydraulic piston which at least partially radially surrounds the spindle and the spindle nut and is rotatably fixedly connected to the spindle and which carries out an axial piston stroke as a result of the rotation of the spindle nut. The system includes a housing which at least partially surrounds the hydraulic piston and forms a hydraulic cylinder, and an axial recess, in the hydraulic cylinder, which forms an anti-twist protection together with a torque support formed at the hydraulic piston and using which the hydraulic piston and the spindle are secured against twisting during a rotation of the spindle nut, the recess forming a sliding surface for the torque support of the hydraulic piston.

11 Claims, 4 Drawing Sheets

(51) Int. Cl.
  *B60T 7/04*   (2006.01)
  *B60T 8/32*   (2006.01)
(58) Field of Classification Search
  CPC .... F16H 2025/204; F16H 25/20; F15B 15/06; F15B 7/08
  See application file for complete search history.

(56) References Cited

U.S. PATENT DOCUMENTS

| | | | | |
|---|---|---|---|---|
| 5,348,123 | A * | 9/1994 | Takahashi | B60T 13/745 |
| | | | | 188/162 |
| 6,230,492 | B1 * | 5/2001 | Kingston | F15B 7/08 |
| | | | | 92/136 |
| 6,357,835 | B1 * | 3/2002 | Boisseau | B60T 13/745 |
| | | | | 303/113.5 |
| 2012/0160043 | A1 * | 6/2012 | Drumm | F16H 25/20 |
| | | | | 74/89.23 |
| 2013/0327606 | A1 * | 12/2013 | Platzer | F16D 65/0006 |
| | | | | 188/368 |
| 2015/0076972 | A1 * | 3/2015 | Leiber | H02K 7/06 |
| | | | | 310/68 B |
| 2017/0030445 | A1 * | 2/2017 | Weh | F15B 15/14 |
| 2017/0316090 | A1 | 11/2017 | Shin | |
| 2018/0345934 | A1 * | 12/2018 | Weh | F04B 17/03 |
| 2019/0017502 | A1 * | 1/2019 | Ohm | F16H 25/20 |
| 2019/0023249 | A1 | 1/2019 | Gaffe et al. | |
| 2019/0100172 | A1 | 4/2019 | Lee | |
| 2020/0361434 | A1 * | 11/2020 | Weh | F04B 53/06 |

FOREIGN PATENT DOCUMENTS

| | | | | |
|---|---|---|---|---|
| CN | 111886835 A | 11/2020 | | |
| DE | 102016209670 A1 * | 12/2016 | ............ | B60T 13/745 |
| FR | 3047787 A1 * | 8/2017 | ............ | F16D 65/14 |
| GB | WO-8903783 A1 * | 5/1989 | ............ | B60T 13/745 |
| WO | 2017045804 A1 | 3/2017 | | |

* cited by examiner

ELECTROMECHANICAL BRAKE PRESSURE GENERATOR FOR A HYDRAULIC BRAKING SYSTEM OF A VEHICLE AND METHOD FOR MANUFACTURING AN ELECTROMECHANICAL BRAKE PRESSURE GENERATOR

CROSS REFERENCE

The present application claims the benefit under 35 U.S.C. § 119 of German Patent Application No. DE 102019205977.5 filed on Apr. 25, 2019, which is expressly incorporated herein by reference in its entirety.

FIELD

The present invention relates to an electromechanical brake pressure generator for a hydraulic braking system of a vehicle and to a method for manufacturing an electromechanical brake pressure generator.

The electromechanical brake pressure generator includes, in particular, a threaded drive system for converting a drive-side rotary motion into a translatory motion for the brake pressure generation.

BACKGROUND INFORMATION

The foot force of the driver is mostly not sufficient for braking passenger cars, so that these are usually equipped with a brake booster. Brake boosters in general frequently operate with the aid of a vacuum generated by the internal combustion engine. The pressure difference between the engine pressure and the ambient pressure is used in the process to apply a boosting force onto the piston rod of the piston/cylinder unit, in addition to the foot force of the driver.

Alternative brake pressure buildup devices are needed for future drive concepts of motor vehicles since a vacuum is no longer available to operate a conventional vacuum brake booster. For this purpose, the electromechanical brake pressure generators of interest here were developed.

The actuating force is generated in the process at the piston/cylinder unit with the aid of an electric motor. Such electromechanical brake pressure generators may not only be used to provide an auxiliary force, but in brake by wire systems also to single-handedly provide the actuating force. Electromechanical brake pressure generators are thus of advantage, in particular, with respect to autonomous driving.

A conventional electromechanical brake booster is described in PCT Application No. WO 2017/045804 A1, which is shown in FIG. 1. In contrast, the present invention is directed to an electromechanical brake pressure generator, which is able to apply a braking force independently of an actuation of the brake pedal. The conventional brake booster 1 includes a spindle nut 2 and an electric motor (not shown) with the aid of which spindle nut 2 may be made to carry out a rotation via a spur gear 3. Spindle nut 2 is operatively engaged with a spindle 4, which is why spindle 4 may be made to carry out a translatory motion along its spindle axis 5 with the aid of spindle nut 2 made to carry out the rotation. To prevent spindle 4 from co-rotating as a result of the rotation of spindle nut 2, brake booster 1 includes a bearing system 6 to which spindle 4 is fixedly connected.

Bearing system 6 includes a bracket 6a, on the edges of which two sliding bearings 6b are situated. Sliding bearings 6b run on tie rods 7 which extend essentially in parallel to spindle axis 5. Spindle 4 is movable in the axial direction with the aid of this bearing system 6 and is secured against twisting.

It is an object of the present invention to provide an electromechanical brake pressure generator including a threaded drive system which ensures a more efficient manufacture of the anti-twist protection.

SUMMARY

The object may achieved by an example electromechanical brake booster in accordance with the present invention. In addition, the present invention provides a method for manufacturing such an electromechanical brake pressure generator. Advantageous refinements of the present invention are described herein.

The present invention provides an electromechanical brake pressure generator for a hydraulic braking system of a vehicle. An example electromechanical brake pressure generator according to the present invention includes at least one threaded drive system for converting a drive-side rotary motion into a translatory motion for the brake pressure generation. The threaded drive system includes a spindle nut rotatable with the aid of an electric motor, a spindle cooperating with a thread of the spindle nut so that the spindle is axially displaceable with a rotation of the spindle nut, and a hydraulic piston which at least partially radially surrounds the spindle and the spindle nut and is rotatably fixedly connected to the spindle and which carries out an axial piston stroke as a result of the rotation of the spindle nut.

A threaded drive system shall be understood to mean both a pure spindle drive, in which the spindle nut is in direct contact with the spindle, and a ball screw. A ball screw is a helical gear including balls inserted between the spindle and the spindle nut. Both parts have a helical groove, which together form a helical tube filled with balls. The form-locked connection in the thread transversely to the helical line does not take place between the thread groove and tongue, as is the case with the pure spindle drive, but with the aid of balls.

The threaded drive system furthermore includes a housing which at least partially surrounds the hydraulic piston and which forms a hydraulic cylinder, and an axial recess, which is configured in the hydraulic cylinder and forms an anti-twist protection together with a torque support formed at the hydraulic piston and with the aid of which the hydraulic piston and the spindle are secured against twisting during a rotation of the spindle nut. The housing is preferably formed of at least two housing parts integrally joined to one another. The recess, which extends across the housing parts, forms a continuous and seamless sliding surface in the axial direction for the torque support of the hydraulic piston.

Within the meaning of the present invention, a twisting shall be understood to mean a rotary motion about an axial axis of the spindle. With the rotation of the driven spindle nut, the spindle is accordingly axially displaceable, so that the rotary motion of the electric motor or of the spindle nut may be converted into a translatory motion of the spindle. Twisting is avoided by torque supports, which apply a torque counteracting the rotary motion.

The housing parts shall be understood to mean the components forming the housing, which are independent of one another and integrally joined to one another for forming the housing. The housing parts are preferably made of aluminum. A sliding surface shall be understood to mean a surface which is particularly suitable for sliding of the torque supports. For this purpose, the sliding surface is continuous or extends across both housing parts. In addition, the sliding surface is seamless, i.e., due to the integral joint, the sliding surface does not include an interfering transition for the torque supports between the housing parts. In this way, the wear on the torque supports is reduced, and the durability of such an electromechanical brake pressure generator is increased.

An additional sliding rail is frequently introduced to reduce the wear at an interfering transition. Since the sliding surface is formed directly by the recess, no additional sliding rail is necessary. As a result, the work step in which such a sliding rail is introduced into the recess is eliminated. The electromechanical brake pressure generator is thus manufacturable more efficiently, more easily and more economically.

In one preferred embodiment of the present invention, a contact shoe with the aid of which the torque supports rest against the sliding surface is situated on the torque supports in a contact area with the sliding surface, the contact shoe being made of a material different from the hydraulic piston. A contact shoe within the meaning of the present invention shall be understood to mean an element attached at the torque support which is in direct contact with the sliding surface. The contact shoe preferably completely surrounds the torque support. As a result of the contact shoe, the material of the hydraulic piston may be selected regardless of sliding properties. The material of the contact shoe is advantageously selected in such a way that good sliding pairing is ensured between the material of the sliding surface and that of the contact shoe.

In one further preferred embodiment of the present invention, the contact shoe is made of a plastic material. The contact shoe may, for example, be molded or glued onto the torque support. As a result, such a contact shoe may be implemented easily and economically. In addition, plastic material is light and cost-effective. In the field of plastic materials, there is also a large selection of plastic materials having specific properties, so that a suitable plastic material is locatable for the intended use.

A caulking is preferably implemented at an axial outer end of the housing, so that a bearing for the spindle nut is attachable in the axial direction between the caulking and a housing projection. In mechanics, a caulking denotes the creation of a force-fit and form-locked joint between two individual workpieces by plastic deformation. This deformation of the edge area of at least one of the parts takes place in a way so that they are non-detachably joined to one another.

Such an edge area is situated at the axially outer end of the housing. This edge area of the housing has a material thickness which is suitable for a caulking. As a result of the caulking, the bearing resting against the housing projection may be axially fixed in the housing without additional parts. Such a caulking may be easily and economically implemented during the manufacture.

In one advantageous refinement of the present invention, a radially outer end of the recess includes a rounding. A rounding within the meaning of the present invention shall be understood to mean an area which has no corners. This means that the area at a radially outer end of the recess is designed to be round. Such a rounding counteracts notching effects of corners. In addition, such a recess having a rounding may be created more easily and more cost-effectively due to the milling process.

The present invention additionally provides a method for manufacturing such an electromechanical brake pressure generator. An example method in accordance with the present invention includes the steps of integrally joining the at least two housing parts forming a housing, of forming a hydraulic cylinder which extends across the housing parts and in which a spindle, a spindle nut and a hydraulic piston are accommodated, and of forming recesses, including sliding surfaces, which are situated in the area of the hydraulic cylinder and extend in the axial direction, the recesses and the sliding surfaces extending across the housing parts and, together with torque supports of the hydraulic piston, forming an anti-twist protection for the hydraulic piston and the spindle. Such a method achieves the advantages described with respect to the electromechanical brake pressure generator.

Advantageously, the housing parts forming the housing are integrally joined to one another with the aid of friction stir welding. During friction stir welding, the friction energy is not generated by the relative movement of the two joining partners, but by a wear-resistant rotating tool. An area between the two housing parts is heated in the process by the rotating tool in such a way that the housing parts integrally join with one another. As a result of this welding method, no additional materials or—protective gas is required. In addition, the weld joint is implemented at a relatively low temperature so that little warping occurs on the housing parts.

In one further advantageous embodiment, an axially outer end of the housing is caulked after a bearing supporting the spindle nut has been introduced, so that this bearing is held in the axial direction. The advantages described with respect to the caulking are achieved by such a caulking process.

The present invention furthermore provides a vehicle including an electromechanical brake pressure generator for a hydraulic braking system. Such a vehicle allows the advantages described with respect to the electromechanical brake pressure generator to be achieved. In one preferred embodiment, this vehicle may be an automated or completely autonomous vehicle.

Exemplary embodiments of the present invention are shown in the figures and are described in greater detail in the following description.

DETAILED DESCRIPTION OF EXAMPLE EMBODIMENTS

Figure 1:
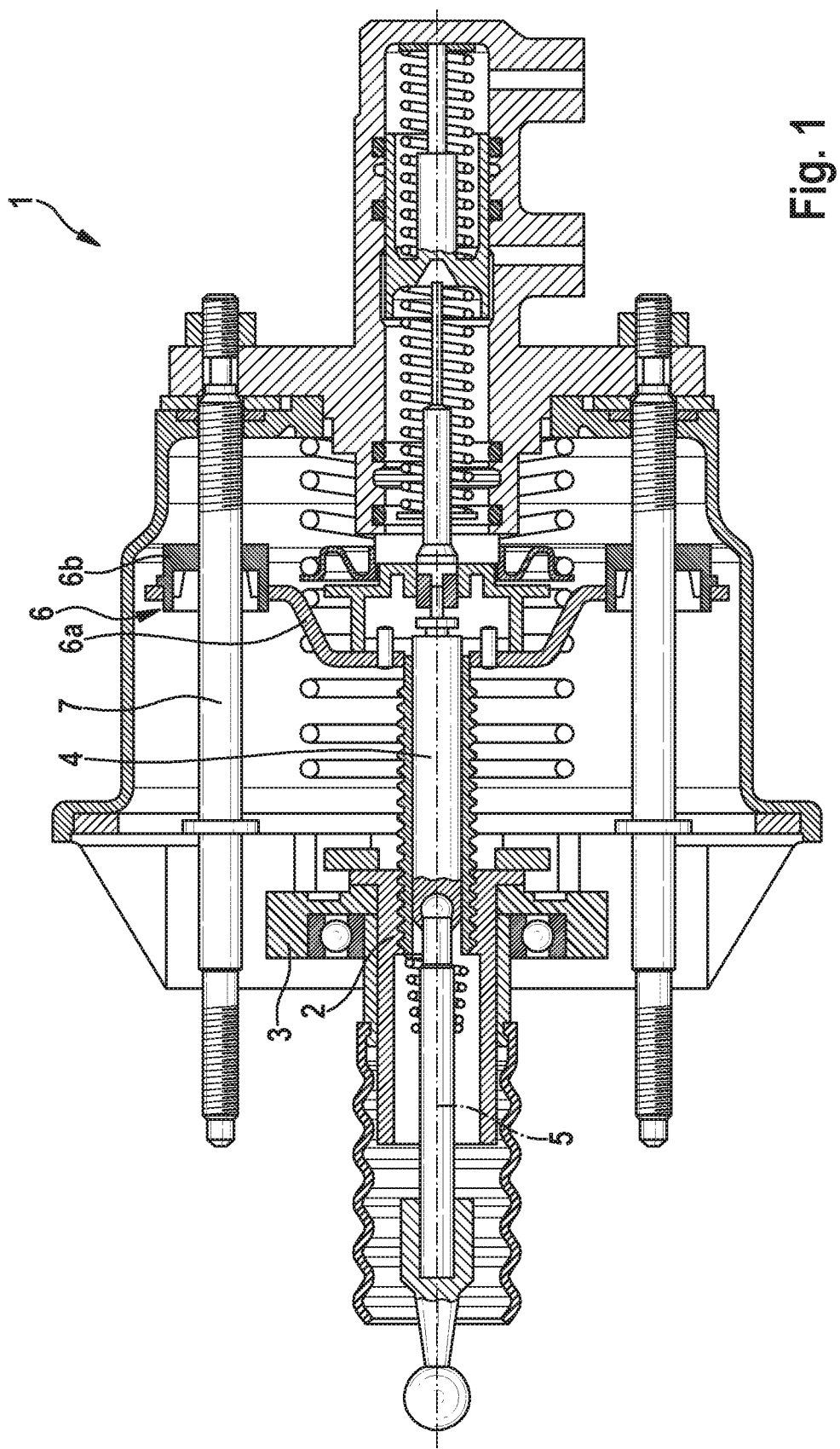
FIG. 1 shows an illustration of a conventional electromechanical brake booster from the related art.
Figure 2:
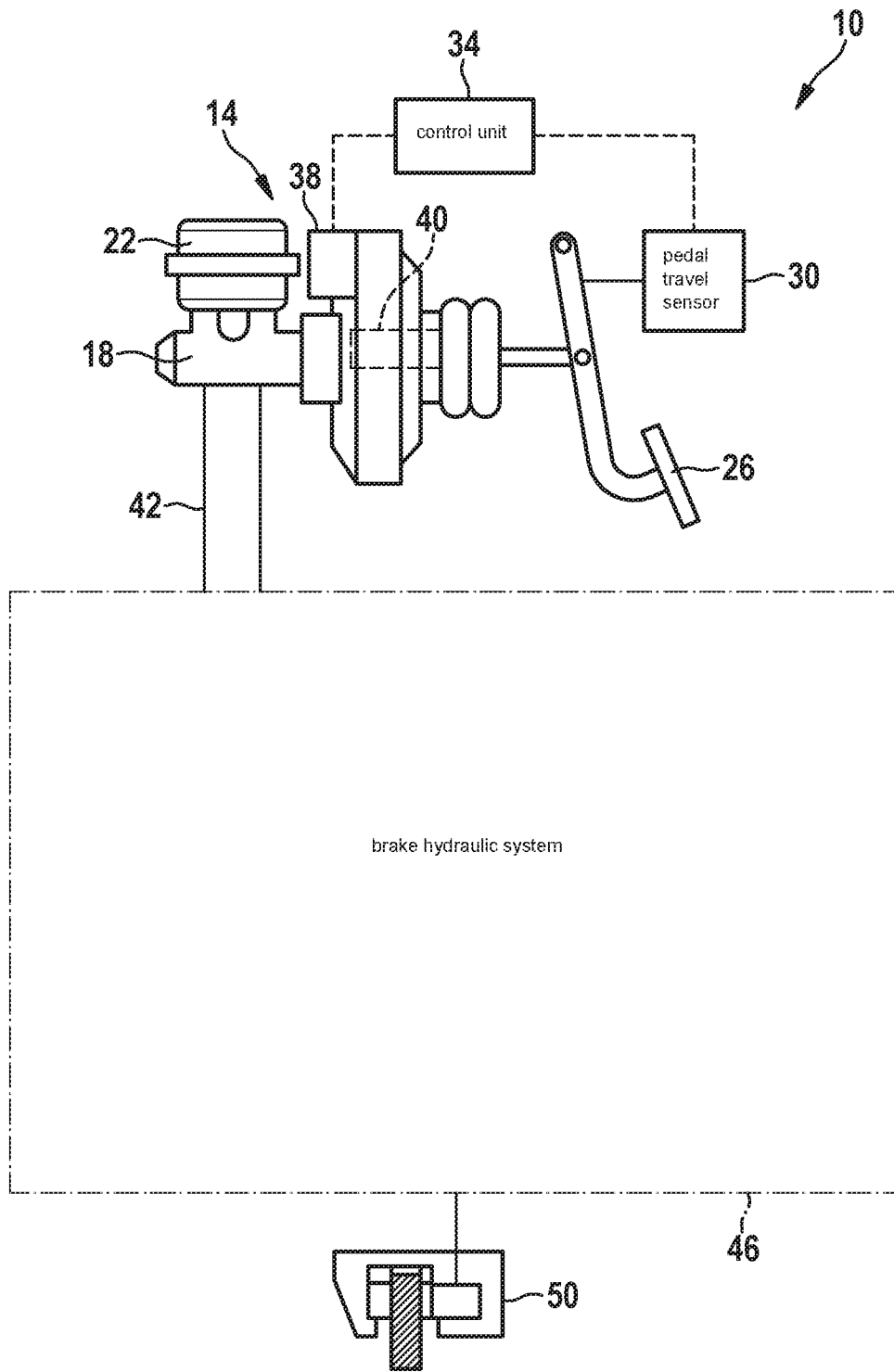
FIG. 2 shows a schematic illustration of a hydraulic braking system for a vehicle including an electromechanical brake pressure generator.

FIG. 2 shows a schematic illustration of a hydraulic braking system 10 for a vehicle including an electromechanical brake pressure generator 14. Hydraulic braking system 10 includes electromechanical brake pressure generator 14. This brake pressure generator 14 includes a piston/cylinder unit 18 which is supplied with brake fluid via a brake fluid reservoir 22.

Piston/cylinder unit 18 may be activated by a brake pedal 26 actuated by the driver, and the resulting brake pedal travel is measured by a pedal travel sensor 30 and forwarded to a control unit 34.

Even though FIG. 2, generally, shows a brake booster, here, the brake pedal travel is measured by pedal travel sensor 30. A brake pressure generation without a brake pedal travel is also possible, so that the vehicle is also brakable in the autonomous driving state.

Based on the measured brake pedal travel, control unit 34 generates a control signal for an electric motor 38 of brake pressure generator 14. Electric motor 38, which is connected to a gearbox (not shown) of brake pressure generator 14, boosts the braking force input by brake pedal 26 within the scope of a decoupled system in accordance with the control signal. For this purpose, a threaded drive system 40 situated in brake pressure generator 14 is activated by electric motor 38 in accordance with the actuation of brake pedal 26 so that the rotary motion of electric motor 38 is converted into a translatory motion.

With the aid of brake pressure generator 14, the brake fluid present in piston/cylinder unit 18 is pressurized by the actuation of brake pedal 26. This brake pressure is forwarded to a brake hydraulic system 46 via brake lines 42. Brake hydraulic system 46, which is only shown as a box here, is formed by various valves and other components for forming a, for example, electronic stability program (ESP). Brake hydraulic system 46 is additionally connected to at least one wheel brake unit 50 so that a braking force may be applied to wheel brake unit 50 by a corresponding switching of valves.

Figure 3:
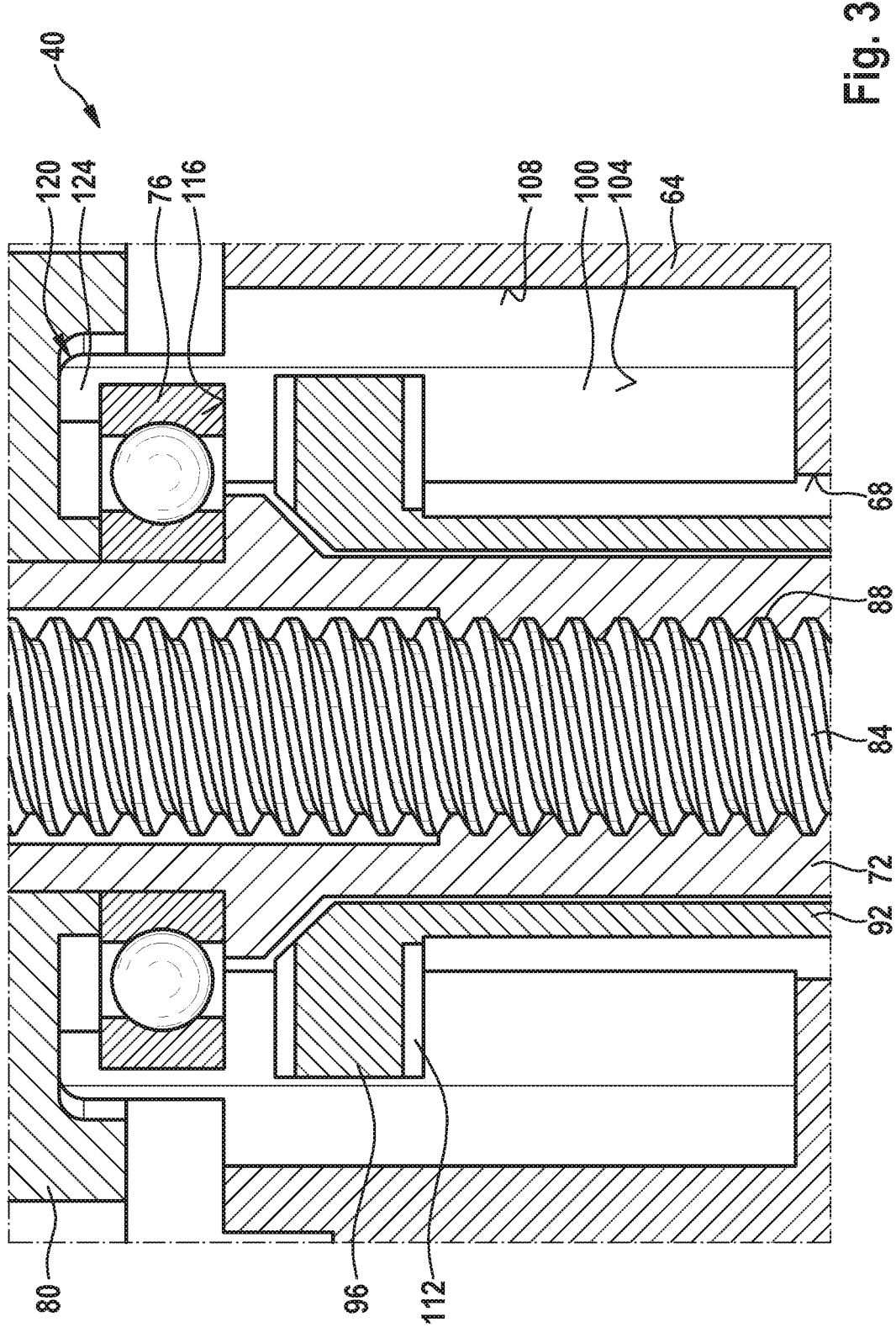
FIG. 3 shows a sectional illustration of one exemplary embodiment of a threaded drive system according to the present invention of the electromechanical brake pressure generator.

FIG. 3 shows a sectional illustration of one exemplary embodiment of a threaded drive system 40 according to the present invention of electromechanical brake pressure generator 14. Threaded drive system 40 includes a housing 64, which is formed of two housing parts 64a, 64b (see FIG. 4). Housing 64, which is made of metal, forms a pot-shaped hydraulic cylinder 68.

Threaded drive unit 40 additionally includes a spindle nut 72, which is supported with the aid of a bearing 76 with respect to housing 64. In this exemplary embodiment, a drive wheel 80, which is rotatably fixedly connected to spindle nut 72, is situated at an axial end of spindle nut 72. Spindle nut 72 is driven by electric motor 38 shown in FIG. 2 with the aid of this drive wheel 80. Spindle nut 72 thus carries out a rotary motion about its longitudinal axis.

Spindle nut 72 surrounds a spindle 84, which is in engagement with spindle nut 72 with the aid of a thread 88. Spindle 84 is rotatably fixedly connected to a hydraulic piston 92 radially surrounding spindle nut 72. Hydraulic piston 92 and housing 64 form an anti-twist protection 96, 100 so that spindle 84 and hydraulic piston 92 are axially displaceable with a rotation of spindle nut 72. Hydraulic piston 92 thus carries out a piston stroke.

Anti-twist protection 96 of hydraulic piston 92 is formed by two torque supports 96 in this exemplary embodiment, which extend radially outwardly and protrude over the remaining hydraulic piston 92 on the outer side. The two torque supports 96 are situated at an angle of 180° with respect to one another. Anti-twist protection 100 of housing 64 is formed by two recesses 100 extending in the axial direction, in which torque supports 96 engage, so that hydraulic piston 92 and spindle nut 72 are secured against twisting.

Recesses 100 form sliding surfaces 104 extending in the axial direction, against which torque supports 96 rest. In addition, recesses 100 include a rounding 108 at radially outer ends. With a rotation of spindle nut 72, torque supports 96 slide in the axial direction on sliding surfaces 104 of recesses 100. In a contact area with sliding surface 104, torque supports 96 include contact shoes 112, with the aid of which improved sliding properties are achieved. In this exemplary embodiment, contact shoes 112 are made of plastic.

Bearing 76, with the aid of which spindle nut 72 is supported with respect to housing 64, is situated in housing 64 in the axial direction between a housing projection 116 and an axially outer end 120 of housing 64. A caulking 124 is formed at the axially outer end 120 of housing 64, so that bearing 76 is held between housing projection 116 and caulking 124 in the axial direction. This caulking 124 is formed after the installation of bearing 76.

Figure 4:
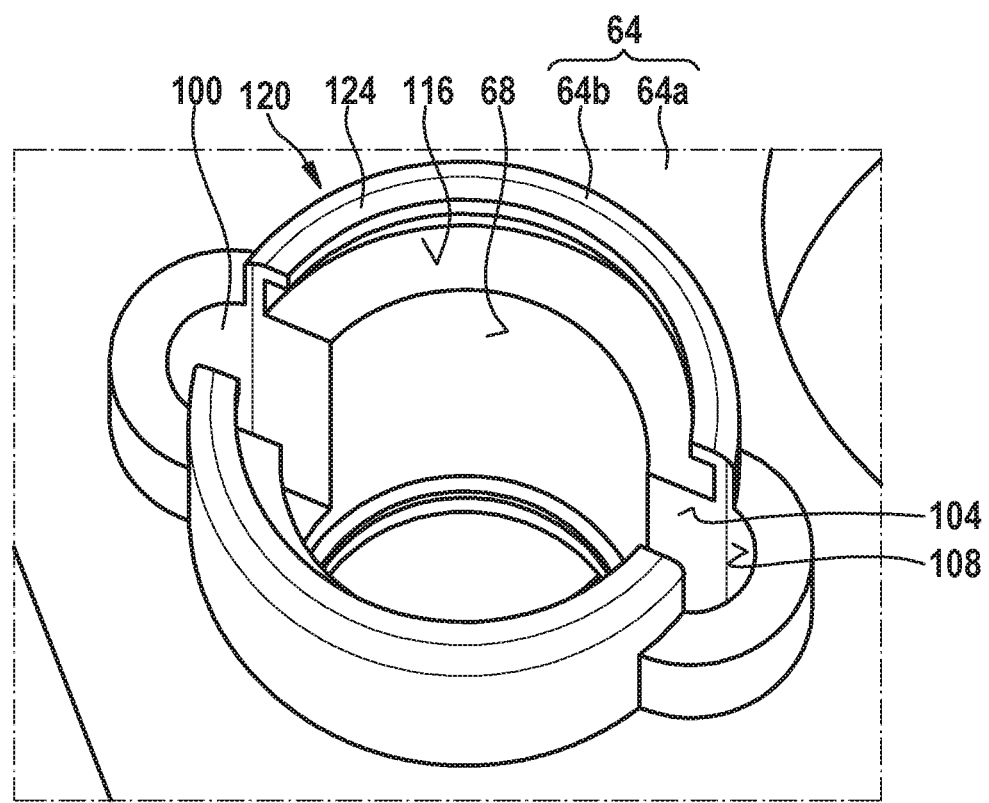
FIG. 4 shows a perspective view of one exemplary embodiment of a housing of the threaded drive system of the electromechanical brake pressure generator.

FIG. 4 shows a perspective view of one exemplary embodiment of housing 64 of threaded drive system 40 of electromechanical brake pressure generator 14. For better illustration, spindle nut 72, spindle 84, bearing 76 and hydraulic piston 92 have been omitted in this figure. This figure furthermore shows caulking 124, which is only formed after an installation of bearing 76.

It is additionally apparent in this figure that housing 64 is formed of a first housing part 64a and a second housing part 64b. Second housing part 64b is integrally joined to first housing part 64a, for example with the aid of friction stir welding. After both housing parts 64a, 64b have been joined to one another, hydraulic cylinder 68 and recesses 100 including sliding surfaces 104 are formed, for example with the aid of milling. Due to the integral joint between the two housing parts 64a, 64b, a continuous and seamless sliding surface 104 may thus be created. As a result, a subsequently inserted sliding rail may be dispensed with, so that only contact shoes 112 are situated at torque supports 96.

What is claimed is:

1. An electromechanical brake pressure generator for a hydraulic braking system of a vehicle, the brake pressure generator comprising:
    a threaded drive system that is configured to convert a drive-side rotary motion into a translatory motion and that includes:
        a drive wheel that is rotatable by an electric motor;
        a spindle nut that is arranged at an interior of the drive wheel and is rotationally fixed relative to the drive wheel, so that the spindle nut rotates whenever the drive wheel rotates;
        a spindle which cooperates with a thread of the spindle nut so that the spindle is axially displaced with a rotation of the spindle nut;
        a hydraulic piston of a piston/cylinder unit, the piston/cylinder unit being actuatable by the threaded drive system for hydraulic brake pressure generation; and
        a housing of the piston/cylinder unit that at least partially surrounds the spindle, the spindle nut, and the hydraulic piston;
    wherein:
        an anti-twist protection, via which the spindle is secured against twisting during the rotation of the spindle nut, includes a torque support that (a) is part of the hydraulic piston and (b) engages in an axial recess of the housing, the recess forming a sliding surface for the torque support of the hydraulic piston;
        the spindle nut includes a radially outwardly extending projection that has a first spindle nut surface facing in a first axial direction;
        a groove extends, within a thickness of a wall of the housing, circumferentially around a longitudinal central axis of the spindle and is divided into multiple sections by the axial recess which is formed within the thickness of the wall of the housing perpendicularly to the groove;

the groove has a groove floor facing in the first axial direction and a groove ceiling facing in a second axial direction that is opposite to the first axial direction;

the drive wheel extends with a portion of the drive wheel passing radially inwards over an exterior edge of the housing that faces in the first axial direction towards the passing portion of the drive wheel, the passing portion of the drive wheel not being radially within the housing;

a radially interior region of the drive wheel is attached to the spindle nut and has a first drive wheel surface that faces in the second axial direction and that is within the housing;

the threaded drive system includes a bearing ring;

a radially exterior edge section of the bearing ring is held within the groove with a first exterior bearing ring surface of the radially exterior edge section of the bearing ring that faces in the first axial direction abutting against the groove ceiling and a second exterior bearing ring surface of the radially exterior edge section of the bearing ring that faces in the second axial direction abutting against the groove floor; and a radially interior edge section of the bearing ring is held with a first interior bearing ring surface of the radially interior edge section of the bearing ring that faces in the first axial direction abutting against the first drive wheel surface of the radially interior region of the drive wheel and a second interior bearing ring surface of the radially interior edge section of the bearing ring that faces in the second axial direction abutting against the first spindle nut surface of the radially outwardly extending projection of the spindle nut, the bearing ring thereby fixing an axial position of the spindle nut relative to the housing, with the spindle nut being rotatable relative to the housing, while engagement of the torque support with the axial recess rotationally fixes the spindle relative to the housing, with the spindle being axially translatable relative to the housing.

2. The electromechanical brake pressure generator as recited in claim 1, wherein at least a portion of the spindle nut is arranged radially between at least a portion of the hydraulic piston and at least a portion of the spindle and the torque support is arranged at an axial position occupied by the spindle nut.

3. The electromechanical brake pressure generator as recited in claim 1, wherein the housing is formed of a first housing part and a second housing part that is integrally joined to the first housing part and projects perpendicularly from an exterior edge surface of the first housing part that faces in the first axial direction, the recess extending from within the first housing part into the second housing part, and the sliding surface is continuous and seamless in the axial directions.

4. The electromechanical brake pressure generator as recited in claim 1, wherein a contact shoe via which the torque support rests against the sliding surface is situated at the torque support in a contact area with the sliding surface, the contact shoe being made of a material different from the hydraulic piston.

5. The electromechanical brake pressure generator as recited in claim 4, wherein the contact shoe is made of a plastic material.

6. The electromechanical brake pressure generator as recited in claim 1, wherein an axially extending radially outer edge of the recess (a) protrudes radially outward beyond a radially exterior surface of the housing that is present in a circumferential region of the housing that includes the groove and (b) is rounded about an axis that is parallel to the longitudinal central axis of the spindle.

7. The electromechanical brake pressure generator as recited in claim 1, wherein the radially outwardly extending projection of the spindle nut includes a second spindle nut surface that faces in the second axial direction and that is arranged as an end stop that limits an extent to which the torque support is axially slidable in the first axial direction within the recess.

8. A method for manufacturing an electromechanical brake pressure generator for a hydraulic braking system of a vehicle, the electromechanical brake pressure generator including a threaded drive system that is configured to convert a drive-side rotary motion into a translatory motion, the threaded drive system including a drive wheel that is rotatable by an electric motor, a spindle nut, a spindle, a hydraulic piston of a piston/cylinder unit, and a housing of the piston/cylinder unit, the method comprising the following steps:

integrally joining at least two housing parts to form the housing; and forming an axial recess of the housing that (a) extends axially and includes a sliding surface, the recess and the sliding surface extending across the housing parts, and (b) together with a torque support which is part of the hydraulic piston and engages in the axial recess, forms an anti-twist protection via which the spindle is secured against twisting during the rotation of the spindle nut;

wherein:

the spindle nut is arranged at an interior of the drive wheel and is rotationally fixed relative to the drive wheel, so that the spindle nut rotates whenever the drive wheel rotates;

the spindle cooperates with a thread of the spindle nut so that the spindle is axially displaceable by the rotation of the spindle nut;

the piston/cylinder unit is actuatable by the threaded drive system for hydraulic brake pressure generation;

the housing at least partially surrounds the spindle, the spindle nut, and the hydraulic piston;

the spindle nut includes a radially outwardly extending projection that has a first spindle nut surface facing in a first axial direction;

a groove extends, within a thickness of a wall of the housing, circumferentially around a longitudinal central axis of the spindle and is divided into multiple sections by the axial recess which is formed within the thickness of the wall of the housing perpendicularly to the groove;

the groove has a groove floor facing in the first axial direction and a groove ceiling facing in a second axial direction that is opposite to the first axial direction;

the drive wheel extends with a portion of the drive wheel passing radially inwards over an exterior edge of the housing that faces in the first axial direction towards the passing portion of the drive wheel, the passing portion of the drive wheel not being radially within the housing;

a radially interior region of the drive wheel is attached to the spindle nut and has a first drive wheel surface that faces in the second axial direction and that is within the housing;

the threaded drive system includes a bearing ring;

a radially exterior edge section of the bearing ring is held within the groove with a first exterior bearing ring surface of the radially exterior edge section of the bearing ring that faces in the first axial direction abutting against the groove ceiling and a second exterior bearing ring surface of the radially exterior edge section of the bearing ring that faces in the second axial direction abutting against the groove floor; and a radially interior edge section of the bearing ring is held with a first interior bearing ring surface of the radially interior edge section of the bearing ring that faces in the first axial direction abutting against the first drive wheel surface of the radially interior region of the drive wheel and a second interior bearing ring surface of the radially interior edge section of the bearing ring that faces in the second axial direction abutting against the first spindle nut surface of the radially outwardly extending projection of the spindle nut, the bearing ring thereby fixing an axial position of the spindle nut relative to the housing, with the spindle nut being rotatable relative to the housing, while engagement of the torque support with the axial recess rotationally fixes the spindle relative to the housing, with the spindle being axially translatable relative to the housing.

9. The method as recited in claim 8, wherein the housing parts forming the housing are integrally joined to one another using friction stir welding.

10. The method as recited in claim 8, wherein an axially outer end of the housing is caulked after the bearing ring has been introduced to thereby form the ceiling of the groove.

11. A vehicle, comprising:
a hydraulic braking system; and
an electromechanical brake pressure generator for the hydraulic braking system, the electromechanical brake pressure generator including a threaded drive system (a) that is configured to convert a drive-side rotary motion into a translatory motion and (b) that includes:
a drive wheel that is rotatable by an electric motor;
a spindle nut that is arranged at an interior of the drive wheel and is rotationally fixed relative to the drive wheel, so that the spindle nut rotates whenever the drive wheel rotates;
a spindle which cooperates with a thread of the spindle nut so that the spindle is axially displaced with a rotation of the spindle nut;
a hydraulic piston of a piston/cylinder unit, the piston/cylinder unit being actuatable by the threaded drive system for hydraulic brake pressure generation; and
a housing of the piston/cylinder unit that at least partially surrounds the spindle, the spindle nut, and the hydraulic piston;

wherein:
an anti-twist protection, via which the spindle is secured against twisting during the rotation of the spindle nut, includes a torque support that (a) is part of the hydraulic piston and (b) engages in an axial recess of the housing, the recess forming a sliding surface for the torque support of the hydraulic piston;

the spindle nut includes a radially outwardly extending projection that has a first spindle nut surface facing in a first axial direction;

a groove extends, within a thickness of a wall of the housing, circumferentially around a longitudinal central axis of the spindle and is divided into multiple sections by the axial recess which is formed within the thickness of the wall of the housing perpendicularly to the groove;

the groove has a groove floor facing in the first axial direction and a groove ceiling facing in a second axial direction that is opposite to the first axial direction;

the drive wheel extends with a portion of the drive wheel passing radially inwards over an exterior edge of the housing that faces in the first axial direction towards the passing portion of the drive wheel, the passing portion of the drive wheel not being radially within the housing;

a radially interior region of the drive wheel is attached to the spindle nut and has a first drive wheel surface that faces in the second axial direction and that is within the housing;

the threaded drive system includes a bearing ring;

a radially exterior edge section of the bearing ring is held within the groove with a first exterior bearing ring surface of the radially exterior edge section of the bearing ring that faces in the first axial direction abutting against the groove ceiling and a second exterior bearing ring surface of the radially exterior edge section of the bearing ring that faces in the second axial direction abutting against the groove floor; and a radially interior edge section of the bearing ring is held with a first interior bearing ring surface of the radially interior edge section of the bearing ring that faces in the first axial direction abutting against the first drive wheel surface of the radially interior region of the drive wheel and a second interior bearing ring surface of the radially interior edge section of the bearing ring that faces in the second axial direction abutting against the first spindle nut surface of the radially outwardly extending projection of the spindle nut, the bearing ring thereby fixing an axial position of the spindle nut relative to the housing, with the spindle nut being rotatable relative to the housing, while engagement of the torque support with the axial recess rotationally fixes the spindle relative to the housing, with the spindle being axially translatable relative to the housing.

* * * * *